(Specimens.)

H. CLAUS.
ENAMEL FOR METAL ARTICLES.

No. 485,574. Patented Nov. 1, 1892.

WITNESSES:
Gustave Dieterich
L. M. Wachschlager

INVENTOR:
Hubert Claus.
BY Briesen & Knauth
his ATTORNEYS.

THE NORRIS PETERS CO., PHOTO-LITHO., WASHINGTON, D. C.

UNITED STATES PATENT OFFICE.

HUBERT CLAUS, OF THALE, GERMANY.

ENAMEL FOR METAL ARTICLES.

SPECIFICATION forming part of Letters Patent No. 485,574, dated November 1, 1892.

Application filed September 30, 1892. Serial No. 447,366. (Specimens.)

*To all whom it may concern:*

Be it known that I, HUBERT CLAUS, a resident of Thale-in-the-Harz, Germany, have invented an Improvement in Enamel for Metal Articles, of which the following is a specification, reference being had to the accompanying drawings, forming part hereof, wherein—

Figure 1:
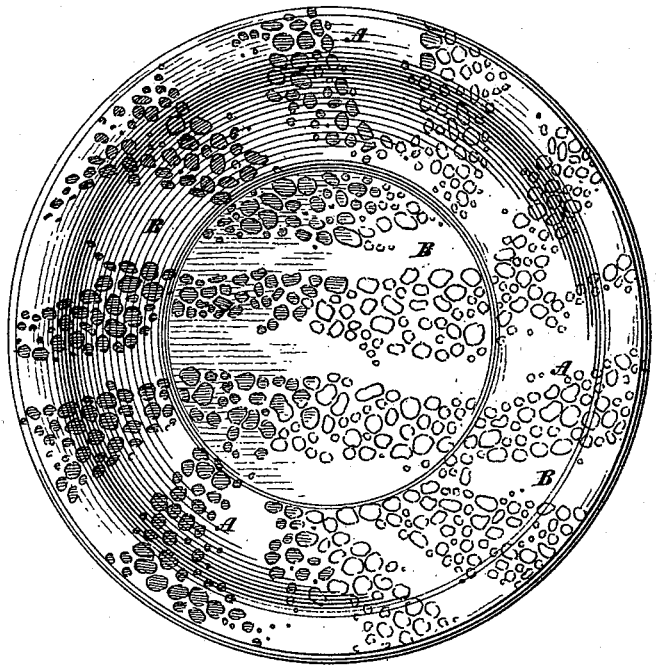
Figure 2:
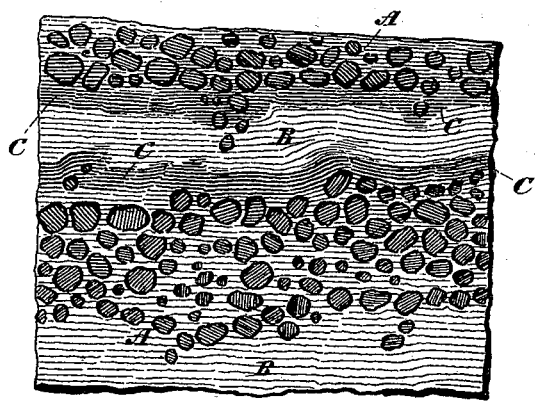

Figure 1 represents a plan view of a vessel ornamented according to my invention. Fig. 2 is a fragment thereof enlarged.

This invention relates to a new enameled-metal article having for its object the production of a characteristic ornamentation in the body of the enamel.
As shown in the drawings, the enameled surface of the vessel is covered with groups A of spots, each spot in the group being lighter in the middle than at its rim. Each group A of such spots is divided from the adjoining group by a blank space B, and in these blank spaces B appear clouds C. The total effect of this ornamentation is strikingly novel and attractive and renders an article having this ornamentation more salable than one decorated by expensive coloring.

The article described results from the process specified in my patent, No. 472,033, dated April 5, 1892, from which patent it will appear that I use in the enamel sulphate of nickel and sulphate of cobalt or analogous metallic salt added to a mixture of feldspar, granite, sand, cryolite, borax, saltpeter, kaolin, and oxide of tin. The mass thus obtained I apply to the glazing on the metallic article, and I then sprinkle by hand or suitable mechanism upon the moist coating of the metal article calcined pulverized carbonate of soda, (ammonia soda,) and I then dry and finally burn the article thus treated. The effect of the soda sprinkling is to produce beautiful spots on the glazed enamel, appearing like pearl eyes of intense sparkle, which spots, in connection with the color of the enamel, produce a harmonious effect, the entire covering being at the same time durable, sufficiently elastic, and quite thin. A transparent glazing consisting of a mixture of feldspar, fluor-spar, quartz, borax, and saltpeter is applied over the enamel above mentioned to protect it from chemical reactions and interferences.

I do not in this application seek to cover the process or any part thereof for producing the desired effect; but What I do claim as new, and desire to secure by Letters Patent, is—

A glaze or enamel for metal articles, having its surface covered with groups A of spots that are lighter in the middle than at their margin, said groups A being separated by blank spaces B, having clouds C, substantially as and for the purpose herein shown and described.

HUBERT CLAUS.

Witnesses:
   HARRY M. TURK,
   CHARLES E. SMITH.